United States Patent [19]

Schick

[11] Patent Number: 4,797,538
[45] Date of Patent: Jan. 10, 1989

[54] CALCULATOR —HORN BUTTON

[76] Inventor: David E. Schick, 1000 E. Oak St., Lamar, Colo. 81052

[21] Appl. No.: 93,960

[22] Filed: Sep. 8, 1987

[51] Int. Cl.⁴ .......................... G06C 5/02; H01H 9/00
[52] U.S. Cl. .................................... 235/1 D; 235/1 R; 235/145 R; 200/5 A; 200/61.57; 180/78
[58] Field of Search ................. 235/1 R, 1 D, 145 R; 200/5 A, 61.54–61.57, 314, 317, DIG. 39; 180/78, 333

[56] References Cited

U.S. PATENT DOCUMENTS 4,578,592  3/1986  Nakazawa et al. .......... 200/61.54 X
4,638,131  1/1987  Kidd et al. .................... 200/5 A X Primary Examiner—B. R. Fuller
Attorney, Agent, or Firm—Dorr, Carson, Sloan & Peterson

[57] ABSTRACT

Apparatus including a calculator that can also function as a horn button is provided for a motor vehicle. The apparatus is mounted on the center of the steering wheel and its downward depression actuates the horn circuit of the vehicle in the same manner as does a conventional horn button. At other times, the keys associated with the calculator portion of the provided apparatus may be operated to perform whatever calculations the operator may desire during periods of time in which the operator's attention is not required for the operation of the motor vehicle.

13 Claims, 3 Drawing Sheets

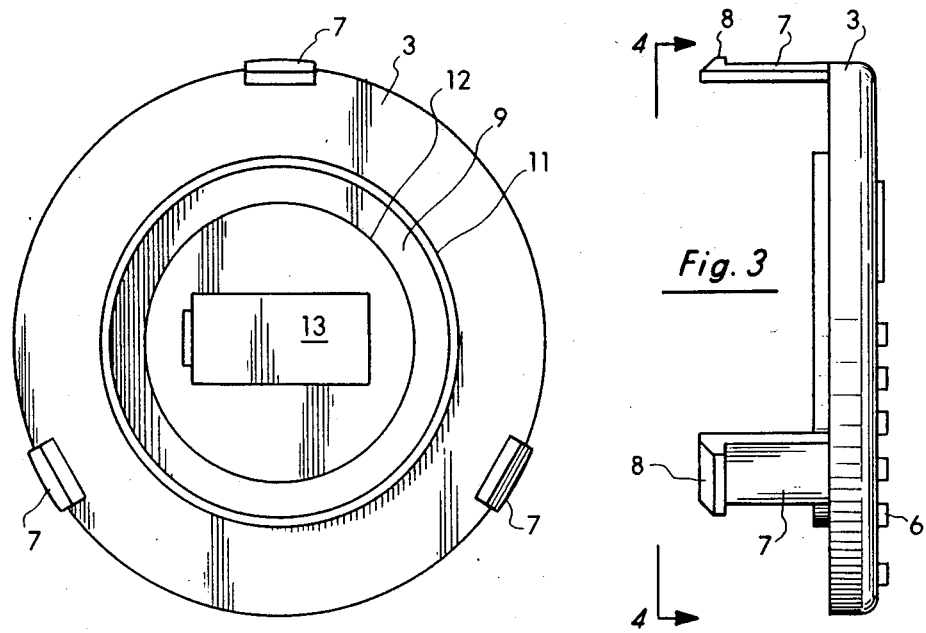
Fig. 4
Fig. 3
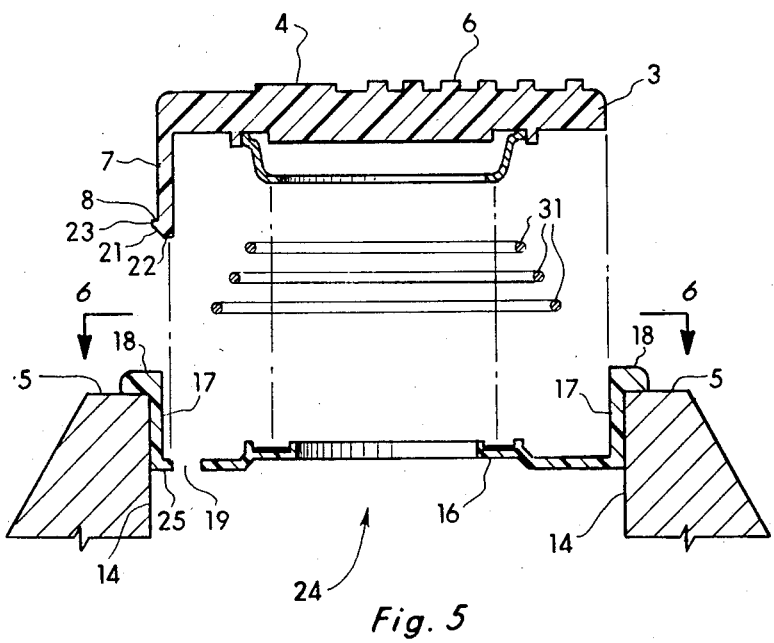
Fig. 5

CALCULATOR—HORN BUTTON

FIELD OF THE INVENTION

This invention relates to a calculator that also functions as a horn button for a motor vehicle.

BACKGROUND OF THE INVENTION

Operators of motor vehicles often have occasion to use calculators to derive information pertaining to the vehicle's operation or to the business purpose for which the vehicle is being used. For example, truck drivers use calculators to compute vehicle operating costs, fuel consumption, the cost of the fuel per mile or to keep track of trip costs. Similarly, traveling salesmen have occasion to use calculators to derive information pertaining to the business purpose for which the vehicle is being used.

It is a problem to find a place to store the calculator within a motor vehicle while, at the same time, to provide instant access to the calculator when required. For example, a calculator could obviously be stored in the vehicle's trunk or glove compartment. While this would provide for secure storage, it would not make the calculator immediately available for use when desired by the operator of the motor vehicle. Similarly, a calculator could be stored in a briefcase, but the same problem of immediate access would pertain. The calculator could also be kept on the seat next to the motor vehicle operator. This would provide immediate access, but would not be a secure place to store the calculator. The calculator could fall off the seat and become lost when the vehicle door is opened.

It can be seen from the above, that it is a problem to provide operators of motor vehicles with convenient and immediate access to a calculator while, at the same time, providing a safe place to store the calculator.

SUMMARY OF THE INVENTION

The present invention overcomes the above discussed disadvantages and achieves an advance in the art by providing a calculator that can also function as a horn button for the steering wheel of a motor vehicle or the like. The calculator is configured to have the same shape, i.e., round or rectangular, etc. as the normal horn button that would otherwise be used. The calculator is equipped with a conventional visual display as well as operating buttons on its top. The calculator is further equipped with elongated tangs on its back side. The tangs are adapted to be inserted into the normal horn button receptacle in the middle of the steering wheel of the vehicle in which the calculator is to be used. The back of the calculator receives electrical contacts which engage contacts on the horn circuit base plate positioned in the top of the steering wheel column. These contacts permit the vehicle's horn to be actuated when pressure in excess of a predetermined amount is exerted anywhere on the top side of the calculator.

The calculator-horn button of the present invention is installed when the driver centers the calculator-horn button over the middle of the steering wheel column, orients the tangs on the back of the calculator-horn button so that they are positioned immediately over and in alignment with cooperating openings in the horn circuit base plate in the middle of the steering wheel column. The calculator-horn button is then pushed downward into the center of the steering wheel column so that the tangs enter and engage the cooperating openings in the horn circuit base plate. The tangs are equipped with inclined surfaces and detents so that they flex inwardly toward the center axis of the steering wheel column as they are pushed downwardly. After the calculator-horn button and its tangs are pushed downwardly sufficiently, they enter and engage the openings in the horn circuit base plate. At this time, the tangs bend outwardly and fixably lock the calculator-horn button to the horn circuit base plate in the same manner as a conventional horn button is locked to the horn circuit base plate. At this time, the electrical contacts on the back of the calculator-horn button are positioned immediately over, but spaced apart from, cooperating contacts on the horn circuit base plate. These contacts function to close the circuit and permit the horn to be activated when the calcuator-horn button is depressed downward with sufficient pressure by the operator of the motor vehicle.

When the calculator-horn button is affixed to the steering wheel in the above described manner, there is provided a safe and convenient storage place for the calculator. The calculator is available for immediate use such as, for example, when the vehicle is parked at a truck stop, a filling station, and the like. At such times, the operator of the motor vehicle may utilize the calculator to enter or derive data pertaining to the vehicle, its use, or the business purpose for which the vehicle is being used. At other times, such as for example, when the vehicle is in operation, the operator of the vehicle may push with sufficient pressure against the top side of the calculator to actuate the vehicle's horn in the same manner as for a conventional horn button. At such times, the contacts on the back side of the calculator cooperate with contacts on the base plate of the horn circuit to close the circuitry required to activate the horn.

It is seen from the above that the present invention overcomes the above discussed disadvantages by providing a safe storage place for a calculator that at the same time provides for immediate access to the calculator when required by the operator of the motor vehicle.

BRIEF DESCRIPTION OF THE DRAWING

These and other advantages and features of the present invention may be more readily understood from a reading of the following description thereof taken in conjunction with the drawing in which;

FIG. 3 illustrates a cross-sectional side view of the calculator-horn button taken along lines 3—3 of FIG. 2;

FIG. 4 illustrates further details of the rear or bottom portion of the calculator-horn button taken along line 4—4 of FIG. 3;

FIG. 5 illustrates a cross-sectional view of the calculator-horn button and the horn circuit base plate;

DETAILED DESCRIPTION

Figure 1:
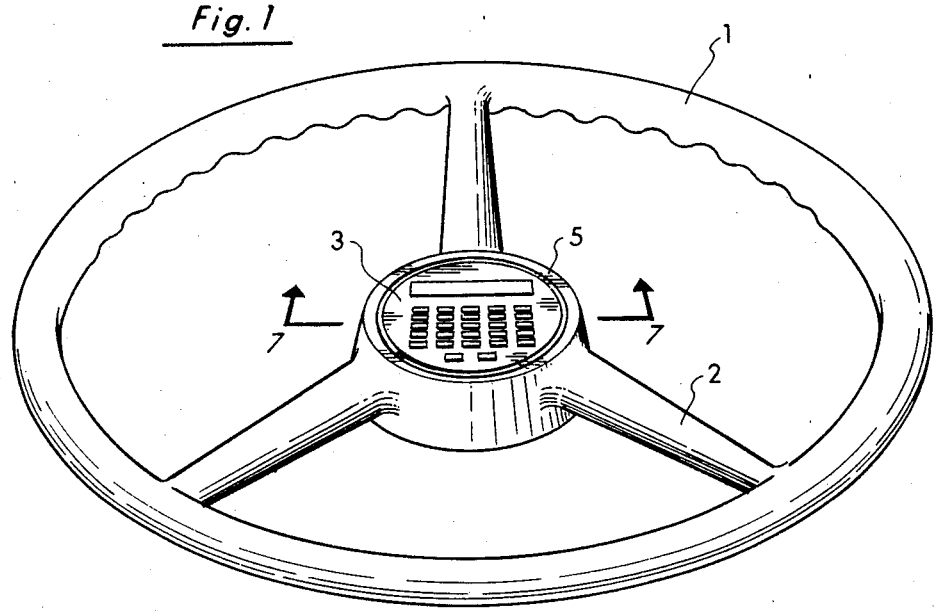
FIG. 1 discloses one possible exemplary embodiment of the calculator-horn button of the present invention.

FIG. 1 discloses a motor vehicle steering wheel embodying the present invention. Shown on FIG. 1 is a steering wheel 1 having spokes 2, a center 5, together with a calculator-horn button 3. The calculator-horn button 3 serves a dual function. First of all, it activates the horn circuit for the vehicle when depressed with sufficient pressure in the same manner as a conventional horn button. Secondly, it can be operated as a calculator during periods of time when the operator's attention is not required to operate the motor vehicle.

Figure 2:
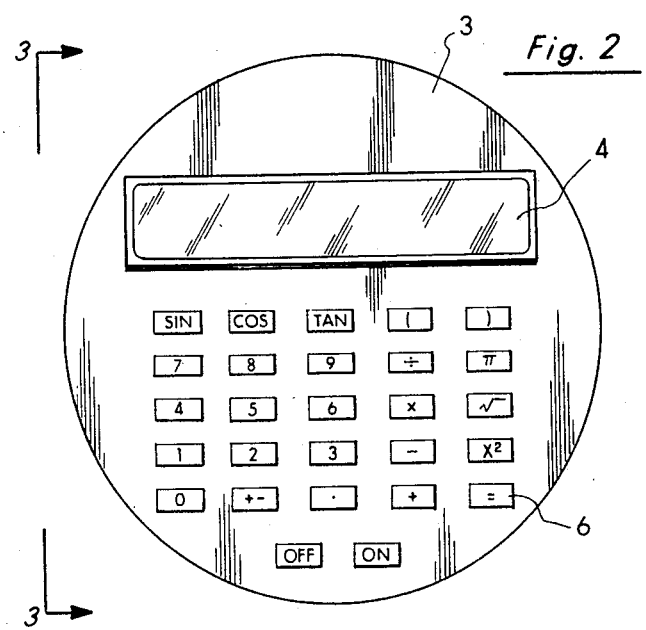
FIG. 2 illustrates further details of the calculator portion of the present invention.

FIG. 2 discloses further details of the calculator-horn button 3. The calculator portion of apparatus 3 includes a digital display 4 such as, for example, an LCD (liquid crystal display) together with a plurality of calculator buttons 6.

FIG. 3 comprises a cross-sectional view of the calculator-horn button taken along lines 3—3 of FIG. 2. Shown on FIG. 3 is the horn button-calculator 3, keys 6 and a plurality of elongated and rearwardly extending tangs 7. As is subsequently described, each tang 7 has a ridge or detent 8 at its outer end.

FIG. 4 discloses a rear view of the calculator-horn button 3 taken along lines 4—4 of FIG. 3. Shown on FIG. 4, are the three tangs 7, a horn button contact recess 9 having an outer circular wall 11 and an inner circular wall 12. Further shown on FIG. 4 is a cover 13 for the battery compartment of the calculator.

Figure 6:
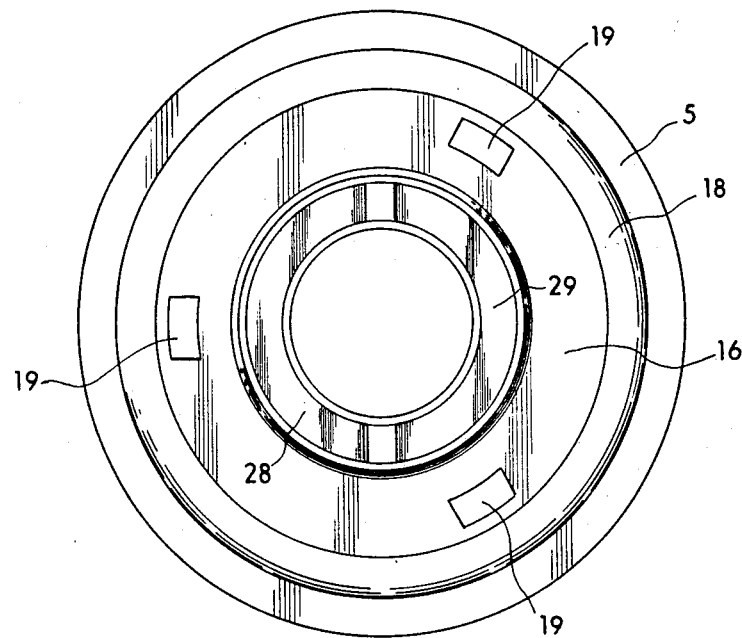
FIG. 6 comprises a top view of the horn circuit base plate taken along lines 6—6 of FIG. 5.

FIGS. 5 and 6 disclose further details of how the calculator-horn button 3 is attached to the steering wheel column of the motor vehicle. Shown on the top of FIG. 5 is the calculator-horn button 3 together with its LCD display 4 and calculator buttons 6. Also shown on the top of FIG. 5 is one of the three tangs 7 attached to the back of the calculator together with the surface 22 comprising the outer portion or end portion of a tang 7. The end portion comprises an outer flat end wall portion 22 perpendicular to the longitudinal axis of tang 7 and a sloping portion 21 which extends upwardly on FIG. 5 until it engages the outer side portion 23 with portion 23 being parallel to the longitudinal axis of tang 7. Surface 8 is a retaining ridge.

Shown on the lower portion of FIG. 5 is the steering wheel column 14 of the motor vehicle together with the apparatus that is affixed to the steering wheel column so as to enable it to receive the tangs 7 of the calculator 3. The inner wall 14 of the steering wheel column and the upper end 5 of the steering wheel column are shown on the lower portion of FIG. 5. A horn circuit contact base plate 16 is shown on both FIGS. 5 and 6. As can be seen, plate 16 is circular and is adapted to fit into steering wheel column recess 24 which is the portion of the steering column between the two walls 14. The base plate 16 at its outer periphery has upwardly extending walls 17 and a right angled lip 18 parallel to the top surface 5 of the steering column. The walls 17 and the lip 18 provide a mounting stop for the base plate 16 to limit the distance that base plate 16 enters chamber 24 of the steering column.

The base plate 16 has three recesses or openings 19 which receive the outer end of the tangs 7. FIG. 6 shows three such recesses 19 while FIG. 5 shows only the particular recess 19 that is adapted to receive the particular tang 7 shown on the upper portion of FIG. 5. The calculator-horn button 3 is affixed to the mounting palte 16 when is moved downwardly as shown on FIG. 5 so that the end portions 22, 21, and 23 of tangs 7 enter and engage the openings 19 of the base plate 16. As the calculator-horn button 3 and its tangs 7 are pushed downward as shown on FIG. 5, the inclined surface 21 engages the left side 25 of the opening 19 and forces the end of tang 7 to the right. This continues until the tang 7 is pushed downward further so that the portion 23 of tang 7 engages and then clears the left side 25 of opening 19. At that time, the top ridge portion 8 of tang 7 is pushed downward and clears the lower surface of side 25 of opening 19. At that time, the lateral stress on tang 7 is released and its outer end snaps to the left on FIG. 5 so that the ridge or surface 8 bears against the lower side 25. This holds the tang 7 firmly within the opening 19 and, in turn, holds the calculator-horn button 3 firmly onto the top outer surface of the steering wheel column.

Figure 7:
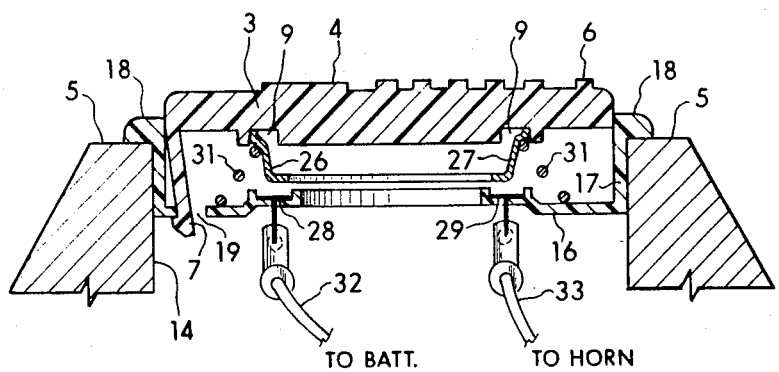
FIG. 7 is a cross-sectional view taken along lines 7—7 of FIG. 1 and discloses further details of the manner in which the calculator-horn button engages the horn circuit base plate.

FIG. 7 discloses a cross-sectional view of the assembled calculator-horn button 3 assembly taken along lines 7—7 of FIG. 1. The calculator-horn button 3 is shown having its tangs 7 extended inwardly into the opening 19 of the base plate 16 so that the lower notched portion of tang 7 is held in place by lower outer portion of the opening 19. Contacts 26 and 27 are attached to the bottom surface of the horn button-calculator and, in particular, the upper portion of the contacts 26 and 27 are within the recess or groove 9. The bottom of spring 31 rests against the top surface of the base plate 16. The top portion of the spring bears against contacts 26 and 27. The upward pressure exerted by spring 31 holds the calculator-horn button 3 and contacts 26 and 27 slightly upward with respect to FIG. 7. Contacts 28 and 29 are mounted on the base plate assembly 16. Contacts 26 and 27 are a singular circular ring and are electrically interconnected with each other while contacts 28 and 29 are electrically separate from one another. Wire 32 connects contact 28 with the nongrounded portion of the electrical circuit of the motor vehicle and wire 33 connects contact 29 with the ungrounded terminal of the horn. Spring 31 is compressed when sufficient downward pressure is exerted anywhere on the top face of the calculator-horn button 3. This downward pressure causes contacts 26 and 27 to engage contacts 28 and 29. Since contacts 26 and 27 are electrically interconnected, this downward depression closes the circuit to actuate the horn. The removal of the downward pressure against element 3 permits spring 31 to disengage contacts 26 and 27 from contacts 28 and 29. This breaks the horn circuit and terminates the actuation of the horn.

It can be seen from the above that the apparatus of the present invention comprises a new and novel apparatus which performs a dual function of a horn button and a calculator for a motor vehicle. The downward depression of the calculator-horn button actuates with a sufficient force the horn circuit of the motor vehicle in the same manner as does a conventional horn button. At other times, the buttons on the calculator can be operated by the use of a lesser force to perform whatever calculations the operator of the motor vehicle may desire at times when the operator's attention is not required for the operation of the motor vehicle.

While preferred embodiments of the present invention have been shown, it is to be expressly understood that modifications and changes may be made thereto and that the present invention is set forth in the following claims.

I claim:

1. In combination;

a motor vehicle steering wheel having means connecting an outer circumferential rim portion of said wheel with a center portion of said wheel, a calculator including keys on a top side of said calculator for performing user specified calculations when selected ones of said keys are depressed by a pressure less than a predetermined amount, securing means for affixing said calculator to said center portion of said wheel so that said calculator can also function as a horn circuit activating means for said vehicle, and means affixed to a back side of said calculator for activating a horn circuit of said vehicle when a pressure greater than said predetermined amount is exerted on said keys on said top side of said calculator.

2. In combination;
a motor vehicle steering wheel having means connecting an outer circumferential rim portion of said wheel with a center portion of said wheel, a calculator including keys on a top side of said calculator for performing user specified calculations when selected ones of said keys are depressed by a pressure less than a predetermined amount, securing means comprising a plurality of elongated tangs each having a first end affixed to a back side of said calculator, said tangs being spaced apart from each other and adjacent an outer periphery of said back side of said calculator, said tangs further being perpendicularly oriented with respect to said back side of said calculator, means positioned in said center portion of said wheel for receiving said tangs to affix said calculator to said center portion of said wheel, and means affixed to said back side of said calculator for activating a horn circuit of said vehicle when a pressure greater than said predetermined amount is exerted on said keys on said top side of said calculator.

3. The combination of claim 2 wherein said tangs comprise;
a detent on a second end of each of said tangs with each detent comprising a sloping portion beginning at said second end and extending outwardly from said tangs and away from a center axis of said steering wheel, each detent also having a flat surface perpendicular to the elongated portion of said tangs and adapted to form a securing ridge for holding each tang and said calculator to said center portion of said wheel.

4. The combination of claim 3 wherein said means for receiving comprises;
a plate having a plurality of spaced apart openings in said center portion of said wheel and configured for receiving said tangs, a lip on each opening for bearing against said sloping portion of each tang to deflect each tang sidewards as said tangs are inserted into said openings, said lip being effective to mate with said securing ridge on each tang when said sloping portion of each tang clears said lip as each of said tangs is fully inserted into one of said openings.

5. The combination of claim 4 wherein said back side of said calculator is circular and wherein said center portion of said wheel has a circular recess for receiving said calculator as said tangs are inserted into said openings.

6. The combination of claim 4 wherein said means on said back side for actuating said horn circuit comprises:
an annular recess on said back side, a circular conductive means inserted into said annular recess, a first and a second contact means affixed to said plate, a spring positioned between said back side of said calculator and said plate for holding said circular conductive means away from said first and second contact means, and said spring being responsive to said pressure greater than said predetermined amount on said top side of said calculator for enabling said circular conductive means to contact said first and second contact means to activate said horn circuit.

7. Apparatus for enabling a calculator to perform user specified calculations as well as to also function as a horn button for activating a horn circuit for a motor vehicle, said apparatus comprising;
keys on a top side of said calculator for performing user specified calculations when selected ones of said keys are depressed by a pressure less than a predetermined amount, securing means on a back side of said calculator for securing said calculator to a center portion of a steering wheel for said vehicle, and means on said back side of said calculator for activating said horn circuit when a pressure greater then said predetermined amount is exerted against any portion of said top side of said calculator including said keys of said calculator.

8. Apparatus for enabling a calculator to perform user specified calculations as well as to also function as a horn button for activating a horn circuit of a motor vehicle, said apparatus comprising;
keys on a top side of said calculator for performing user specified calculations when selected ones of said keys are depressed by a pressure less than a predetermined amount, securing means comprising a plurality of elongated flexible tangs each having a first end affixed to a back side of said calculator, said tangs being spaced equi-distance from each other and adjacent an outer periphery of said back side of said calculator, said tangs further being perpendicularly oriented with respect to said back side of said calculator, means connectable to a center portion of a steering wheel for said vehicle for receiving said tangs to affix said calculator to said center portion of said wheel, and means on said back side of said calculator for activating said horn circuit when a pressure greater than said predetermined amount is exerted against any portion of said top side of said calculator including said keys of said calculator.

9. The apparatus of claim 8 wherein said tangs comprise;
a detent on a second end of each of said tangs with each detent comprising a sloping portion beginning at said second end and extending outwardly from said tangs and away from said center portion of said steering wheel, each detent also having a flat surface perpendicular to the elongated portion of said tangs at a terminus of said sloping portion and adapted to form a securing ridge for holding each tang and said calculator to said center portion of said wheel.

10. The apparatus of claim 9 wherein said means for receiving comprises;
   a plate having a plurality of spaced apart openings in said center portion of said wheel and configured for receiving said tangs,
   a lip on each opening for bearing against said sloping portion of each tang to deflect each tang sidewards as said tangs are inserted into said openings,
   said lip being effective to mate with said securing ridge on each tang when said sloping portion of each tang clears said lip as each of said tangs is fully inserted into one of said openings.

11. The apparatus of claim 10 wherein said back side of said calculator is circular and wherein said center of said wheel has a circular recess for receiving said calculator as said tangs are inserted into said openings.

12. The combination of claim 10 wherein said means on said back side for activating said horn circuit comprises:
   an annular recess on said back side of said calculator,
   circular conductive means inserted into said annular recess,
   a first and a second contact means affixed to said plate,
   a spring positioned between said back side of said calculator and said plate for holding said circular conductive means away from said first and second contact means, and
   said spring being responsive to said pressure greater than said predetermined amount on said top side of said calculator for enabling said circular conductive means to contact said first and second contact means to activate said horn circuit.

13. In combination;
   a motor vehicle steering wheel having spokes connecting an outer circumferential rim portion of said wheel with a circular center portion of said wheel,
   a circular calculator including keys on a circular top side of said calculator for performing user specified calculations,
   a plurality of elongated tangs for affixing said circular calculator to said circular center portion of said wheel,
   each of said tangs having a first end affixed to a circular back side of said calculator, said tangs being perpendicularly oriented with respect to said back side of said calculator,
   said tangs being spaced equi-distance from each other and adjacent an outer periphery of said back side of said calculator,
   means positioned in said center portion of said wheel for receiving said tangs to affix said calculator to said center portion of said wheel,
   a detent on a second end of each of said tangs with each detent comprising a sloping portion beginning at said second end and extending outwardly from said tangs and away from said center portion of said steering wheel,
   each detent also having a flat surface perpendicular to the elongated portion of said tangs and adapted to form a securing ridge for holding each tang and said calculator to said center portion of said wheel,
   a circular plate on said means for receiving with said plate having a plurality of spaced apart openings in said center portion of said wheel and configured for receiving said tangs,
   a lip on each opening for bearing against said sloping portion of each tang to deflect each tang sidewards as said tangs are inserted into said openings,
   said lip being effective to mate with said securing ridge on each tang when said sloping portion of each tang clears said lip as each of said tangs is fully inserted into one of said openings,
   said center portion of said wheel having a circular recess for receiving said calculator as said tangs are inserted into said openings,
   an annular recess on said circular said back side of said calculator,
   a circular conductive means inserted into said annular recess,
   a first and a second contact means affixed to said plate,
   a spring positioned between said back side of said calculator and said plate for holding said circular conductive means away from said first and second contact means, and
   said spring being responsive to pressure greater than a predetermined amount anywhere on said top side of said calculator including said keys of said calculator for enabling said circular conductive means to contact said first and second contact means to activate a horn circuit of said vehicle.

* * * * *